United States Patent
Hnatow et al.

(10) Patent No.: US 6,420,448 B1
(45) Date of Patent: Jul. 16, 2002

(54) ENERGY ABSORBING FOAMS

(75) Inventors: Michael F. Hnatow, West Chester; Vincenzo A. Bonaddio, Boothwyn, both of PA (US); Chiu Y. Chan, Wilmington, DE (US); Robert Mohr, Williamstown, NJ (US)

(73) Assignee: Foamex LP, Linwood, PA (US)

( * ) Notice: Subject to any disclaimer, the term of this patent is extended or adjusted under 35 U.S.C. 154(b) by 8 days.

(21) Appl. No.: 09/765,023

(22) Filed: Jan. 18, 2001

(51) Int. Cl.$^7$ .............................................. C08G 18/08
(52) U.S. Cl. ........................... 521/174; 264/51; 264/52; 521/126; 521/128; 521/129; 521/130; 521/137
(58) Field of Search .................... 264/51, 52; 523/347; 521/126, 128, 129, 130, 137, 174

(56) References Cited

U.S. PATENT DOCUMENTS

| | | |
|---|---|---|
| 4,777,186 A | 10/1988 | Stang et al. |
| 5,284,882 A * | 2/1994 | Rossio et al. ................ 521/137 |
| 5,527,833 A | 6/1996 | Kuczynski et al. |
| 5,698,609 A | 12/1997 | Lockwood et al. |
| 6,034,148 A * | 3/2000 | Kelly et al. .................... 264/51 |
| 6,316,514 B1 * | 11/2001 | Falke et al. ............ 252/182.27 |

FOREIGN PATENT DOCUMENTS

| WO | WO 93/09934 | 5/1993 |
|---|---|---|

* cited by examiner

*Primary Examiner*—John M. Cooney, Jr.
(74) *Attorney, Agent, or Firm*—Connolly Bove Lodge & Hutz LLP

(57) ABSTRACT

Polyurethane foams formed under vacuum (below atmospheric pressure) conditions using a specific mixture of polyisocyanate and with a major portion of methylene diisocyanate (MDI) and a specific mixture of polyether and graft polyols exhibit superb static shock cushioning characteristics (energy absorption) as illustrated by drop curves of deceleration versus static load. The foam-forming ingredients are mixed together and foamed under controlled pressures in the range 0.5 to 0.90 bar (absolute), preferably 0.5 to 0.8 bar (absolute). A major portion of the MDI is 4, 4' methylene diisocyanate.

15 Claims, 3 Drawing Sheets

ENERGY ABSORBING FOAMS

This invention relates to flexible polyurethane foams used in shipping and packing cartons that isolate or reduce the effects from externally applied shocks or vibrations and thereby protect the contents of the carton.

BACKGROUND OF THE INVENTION

Cellular polyurethane structures typically are prepared by generating a gas during polymerization of a liquid reaction mixture comprised of a polyester or polyether polyol, a polyisocyanate, a surfactant, catalyst and one or more blowing agents. The gas causes foaming of the reaction mixture to form the cellular structure. The surfactant stabilizes the structure.

Polyurethane foams with varying density and hardness may be formed. Hardness is typically measured as IFD ("indentation force deflection") or CFD ("compression force deflection"). Tensile strength, tear strength, compression set, air permeability, fatigue resistance, and energy absorbing characteristics may also be varied, as can many other properties. Specific foam characteristics depend upon the selection of the starting materials, the foaming process and conditions, and sometimes on the subsequent processing. Among other things, polyurethane foams are widely used as energy absorbing cushions and filler in the packaging industry.

Once the foam-forming ingredients are mixed together, it is known that the foam may be formed under either elevated or reduced controlled pressure conditions. PCT Published Patent Application WO 93/09934 discloses methods for continuously producing slabs of urethane polymers under controlled pressure conditions. The foam-forming mixture of polyol, polyisocyanate, blowing agent and other additives is introduced continuously onto a moving conveyor in an enclosure with two sub-chambers. The foaming takes place at controlled pressure. Reaction gases are exhausted from the enclosure as necessary to maintain the desired operating pressure. The two sub-chambers, a saw, and air tight doors are operated in a manner that allows for continuous production of slabstock polyurethane foam.

U.S. Pat. No. 4,777,186 to Stang, et al., describes a method of foaming in a pressurized chamber held above atmospheric pressure (i.e., in the range of about 0.5 to 1000 psig). In addition to the gases emitted during foaming, additional gases may be introduced into the chamber to maintain the elevated pressure during foaming. The resulting foams have a higher ILD to density ratio than those previously known in the art.

U.S. Pat. No. 6,034,148 to Kelly, et al., discloses energy absorbing foams formed with graft polyols, preferably low functionality, low molecular weight graft polyols with high solids content in the range of 35% to 55%. The foaming is carried out at controlled pressures above atmospheric pressure from about 1.2 to about 1.5 bar (absolute). The resulting foams have a density from 1.0 to 4.0 pounds per cubic foot, air permeability between 20 to 140 ft$^3$/ft$^2$/min and pre-flex CFD from 7 to 13 psi.

Energy absorbing polyurethane foams are also disclosed in U.S. Pat. No. 5,698,609 to Lockwood, et al. The open cell polyurethane foams are prepared from a combination of specific polyols reacted with diphenylmethane diisocyanate (MDI) and polyphenylmethylene diisocyanate (poly-MDI) at atmospheric pressure. The resulting foams have a density from 1.5 to 5 pounds per cubic foot and an air flow of 0.05 to 0.5 scfm.

Those of skill in the packaging industry characterize dynamic shock cushioning characteristics ("energy absorption") of materials by developing "drop curves" or plots of deceleration versus static load in accord with ASTM 1596. A foam is cut to a predetermined size, typically 8"×8"×2" (thickness) and positioned on an impact surface. A dropping platen with an adjustable load is dropped into the sample. Instrumentation measures both the peak impact deceleration ("G-level") and impact velocity as the platen deflects the cushion. The impact velocity is checked to be within tolerances, and the peak "G-level" is recorded. The impact velocity corresponds to a "free fall drop height," which is measured in order to compensate for the effect of friction in the dropping apparatus, but the corresponding free fall drop height is typically reported as if it were measured physically. The most commonly used free fall drop height is 24 inches. The platen, with the same static loading, is dropped on the same cushion five times. The static loading is calculated by dividing the mass of the platen by the surface area of the foam sample. Each drop is separated by about one minute. A new cushion sample is used, and a sequence of five drops is performed for another static loading, usually determined by the experience of the operator during the test. The process is repeated until enough data points have been gathered to draw a representative curve. The average of the second through fifth drops in commonly reported as the average "G-level" for each static loading.

Lower "G-levels" indicate greater energy absorption by the foam, or less shock felt by the platen or what would be the packaged object in packaging applications. Prior art packaging materials with a density of about 2.2 pcf using a two-inch sample thickness and a 24-inch "free fall drop height" generally yield G-levels above 60 G at a 1 psi static loading. Prior art conventional foam packaging with a density of about 1.4 pcf yields G-levels above 70 G at a 0.4 psi static loading.

Articles more susceptible to damage have generally lower G values in the range of about 15 to 80 G. More rugged articles (such as television sets and VCRs) have G values generally in the range of about 80 to 100. Significantly rugged articles (such as furniture) may have G values exceeding 115.

An object of the present invention is to produce energy absorbing foam with "drop curves" substantially improved over those previously obtained in the prior art. Where foams with improved "drop curves" are used in packaging applications, either less foam material is required for the same energy absorbing protection, or the foam may be used to package heavier objects than previously possible. Ideally, a lighter foam with lower density that has better or at least equivalent drop curve performance will be used to reduce shipping weight and associated shipping cost.

SUMMARY OF THE INVENTION

According to the invention, foams with improved energy absorption are obtained by a method in which a foam-forming composition of:
  (a) from 10 to 50% by weight total polyol of a polyether polyol having a functionality in the range from about 2.2 to 3.5 and a hydroxyl number in the range of about 28 to 168 and containing up to 30% EO;
  (b) from 50 to 90% by weight total polyol of a graft polyol having a functionality in the range from about 2.5 to 3.0 and a hydroxyl number in the range of about 25 to 50 and containing from 50/50 to 80/20 of styrene/acrylonitrile;

(c) a polyisocyanate containing at least 5% by weight toluene diisocyanate and at least 80% by weight total polyol of methylene diisocyanate (MDI), wherein at least 50% by weight of the methylene diisocyanate is 4, 4' methylene diisocyanate; and (d) a blowing agent, is mixed together and foamed under controlled pressure conditions (vacuum) from about 0.5 to 0.9 bar, preferably 0.5 to 0.8 bar. Preferably, the isocyanate index is in the range of 95 to 110, most preferably 100 to 105.

Most preferably, the foam-forming composition contains up to 2 parts per hundred parts polyol of an amine catalyst, up to 2 parts per hundred parts polyol of a surfactant, up to 0.5 parts per hundred parts polyol of an organotin catalyst, from 2 to 6 parts per hundred parts polyol of water as the blowing agent, and up to 2 parts per hundred parts polyol, preferably from 0.3 to 0.5 parts, of DEOA. In addition, it has been found that from 15 to 25% by weight total polyols of polyether polyol (functionality 3.1 to 3.3) and 75 to 85% by weight total polyols of graft polyol (functionality 2.8 to 2.9) is a preferred combination for polyols. Moreover, the polyisocyanate most preferably contains from 8 to 11% by weight toluene diisocyanate and from 50 to 60% by weight 4, 4' methylene diisocyanate.

Surprisingly, foams prepared according to this invention exhibit excellent energy absorbing characteristics over those of other shipping/packaging foams. The resulting foams have a density in the range of 0.7 to 1.3 pounds per cubic foot, an air permeability from 25 to 140 $ft^3/ft^2$/min, preferably 25 to 60 $ft^3/ft^2$/min, and $IFD_{25}$ of about 40 to 140 lb., preferably 60 to 110 lb. The foams can be made suitable for packaging applications such as electronic equipment, where desired $IFD_{25}$ for the packaging material varies from 30 to 100 lb. At equivalent density, the packaging foams according to the invention are able to sustain much higher static stresses.

DESCRIPTION OF THE PREFERRED EMBODIMENT

Figure 1:
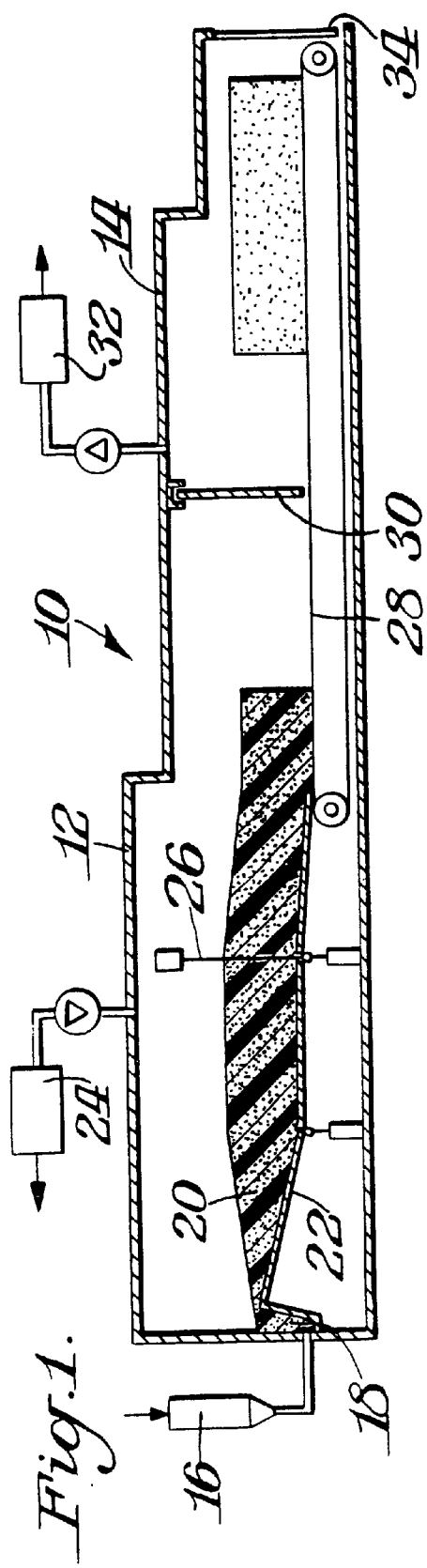
FIG. 1 is a schematic drawing of an apparatus that may be used to form foams under controlled pressures below atmospheric pressure.

Polyether polyols having a functionality of at least 2.0 are known to be suitable for producing flexible polyurethane foams. Polyether polyols used to prepare flexible polyurethane foams typically have molecular weights between 500 and 7000. One example of these conventional polyols is VORANOL 3010 from Dow Chemical, which has a hydroxyl ("OH") number of 56 mg KOH/g and a functionality of 2.9, with an EO content of 8.5%. Another polyol suitable for use in the invention is U-1000 from Bayer AG.

U-1000 has a hydroxyl number of 168 and a functionality of 3.0, but 0% EO content. In addition, there is a group of higher EO polyols, typically used for high resiliency (HR) foam formulations. An example is VORANOL 4001 from Dow Chemical, which has an OH number of 31 and a functionality of 3.2, with an EO content of 15.5%.

The term "polyether polyol" includes linear and branched polyethers (having ether linkages) and containing at least two hydroxyl groups, and includes polyoxypropylene polyether polyol or mixed poly (oxyethylene/oxypropylene) polyether polyol. Preferred polyethers are the polyoxyalkylene polyols, particularly the linear and branched poly (oxyethylene) glycols, poly (oxypropylene) glycols and their copolymers. Graft or modified polyether polyols are those polyether polyols having a polymer of ethylenically unsaturated monomers dispersed therein. Representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea. Graft or modified polyether polyols contain dispersed polymeric solids. The solids increase hardness and mechanical strength of the resultant foam. Especially preferred graft polyols in this invention are VORANOL 3493 or ARCOL HS-100 from Bayer AG.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of isocyanate reactive sites per molecule.

A preferred polyol for the invention has from 15 to 25% by weight conventional polyether polyol and 85 to 75% by weight graft polyol. The polyether polyol has a functionality from 3.1 to 3.3 and hydroxyl number from 28 to 36. The polyether polyol should contain from 18 to 20% EO and 75 to 88% primary OH groups. The graft polyol has a functionality from 2.8 to 2.9 and an hydroxyl number from 25 to 30. It should contain styrene and acrylonitrile in a ratio of about 70 to 30.

The term "polyisocyanate" refers particularly to isocyanates that have previously been suggested for use in preparing polyurethane foams. "Polyisocyanates" include di- and polyisocyanates and prepolymers of polyols and polyisocyanates having excess isocyanate groups available to react with additional polyol. The amount of polyisocyanate employed is frequently expressed by the term "index" which refers to the actual amount of isocyanate required for reaction with all of the active hydrogen-containing compounds present in the reaction mixture multiplied by 100. For most foam applications, the isocyanate index is in the range between about 75 to 140.

Conventional polyisocyanates may be used in this invention. The preferred isocyanate is a mixture of methylene diisocyanate (MDI) and toluene diisocyanate (TDI). A commercially available MDI/TDI mixture is R-7411 from Huntsman/ICI. A well known toluene diisocyanate is TD80, a commercially available blend of 80% of 2, 4 toluene diisocyanate and 20% of 2, 6 toluene diisocyanate. A preferred methylene diisocyanate is R-7400 from Hunstman/ICI, which is a prepolymer with a NCO content of 28.3% with over 50% 4, 4'-methylene diisocyanate. Polyisocyanates are typically used at a level of between 20 and 90 parts by weight per 100 parts of polyol, depending upon the polyol OH content and the water content of the formulation.

In this invention, the MDI/TDI isocyanate mixture was used in an amount from about 80 to 90 parts by weight based on 100 parts polyol for a formulation using about 5 parts per hundred parts polyol of water, and had an isocyanate index from about 95 to 110. Preferably, the MDI/TDI blend contains from 5 to 20 weight percent TDI and 95 to 80 weight percent MDI, with 50% or more of the MDI component comprised of 4, 4' methylene diisocyanate, and the isocyanate index is from 100 to 105. The most preferable isocyanate is an MDI/TDI blend with 8 to 11% by weight TDI and 89% to 92% by weight MDI, wherein 50% to 60% by weight or more of the MDI component is 4, 4' MDI.

Catalysts are used to control the relative rates of water-polyisocyanate (gas-forming) and polyol-polyisocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-polyisocyanate reaction, whereas the organotin catalysts are known to have a greater effect on the polyol-polyisocyanate reaction. Total catalyst levels vary from 0 to 5.0 parts by weight per 100 parts polyol. The amount of catalyst used depends upon the formulation employed and the type of catalyst, as known to those skilled in the art. Although various catalysts may be used in the present invention, control of the gelling catalyst level is critical to producing foams with desired air permeability, which is a factor known to significantly affect foam cushioning performance. We have found that the following ranges of catalyst amounts are satisfactory: amine catalyst from 0 to 2 parts per 100 parts polyol; organotin catalyst from 0 to 0.5 parts per 100 parts polyol.

One or more surfactants are also employed in the foam-forming composition. The surfactants lower the bulk surface tension, promote nucleation of bubbles, stabilize the rising cellular structure and emulsify incompatible ingredients. The surfactants typically used in polyurethane foam applications are polysiloxane-polyoxyalkylene copolymers, which are generally used at levels between about 0.5 and 3 parts by weight per 100 parts polyol. In the present invention, from 0 to 2 parts by weight per 100 parts polyol of surfactant is preferred, and 1 part by weight per 100 parts polyol is most preferred.

A blowing agent may be included in the foam-forming composition. The most typical blowing agent is water that may be added in amounts from 2 to 5.8 parts per hundred parts polyol. Preferably, water as blowing agent is added in an amount suitable to achieve a desired foam density, and the amount may vary depending upon the operating pressure in the foaming chamber. We have found that at a pressure of 0.65 bar, 5.0 parts per hundred parts polyol is an appropriate amount of water to achieve a foam with a density of about 1.0 pounds per cubic feet.

Optionally, other additives may be incorporated into the foam-forming composition. The optional additives include, but are not limited to, fire retardants, stabilizers, antimicrobial compounds, extender oils, dyes, pigments, and antistatic agents. Such additives should not have a detrimental effect on the properties of the final polyurethane foam.

The foam-forming process may be carried out batch-wise, semi-continuously or continuously, as long as the pressure may be controlled and maintained below atmospheric pressure, preferably in the range of about 0.5 to 0.90 bar, most preferably 0.5 to 0.8 bar.

FIG. 1 shows an apparatus that might be used to practice the invention in a continuous process. The figure is taken from the disclosure in W093/09934. In such an apparatus 10, there is a process subchamber 12 and an adjacent airlock subchamber 14. The subchambers 12, 14 are separated from one another by door 30. Foam-forming ingredients are introduced to mix head 16 and mixed for a suitable time. Once mixed together, the foam-forming ingredients form a frothing liquid that is introduced to the bottom of trough 18 and flows upwardly and onto the fall plates 22. The foam rises as it is conveyed away from the trough. After the foam is completely risen, a foam slab 25 is then cut from the foamed material using cut off blade 26. The slab is conveyed by the moving conveyor 28. Fan 24 exhausts process gases to maintain the pressure within the process enclosure 12. The first door 30 opens to allow the slab 25 into the airlock enclosure 14. The door 30 closes and the pressure inside the airlocked chamber is returned to atmospheric conditions. A second exhaust fan 32 removes additional process gases. The foam slab 25 exits the airlock chamber 14 through door 24. The airlock chamber 14 is returned to operating pressure and the process continues.

The invention is further illustrated, but not limited by, the following examples.

EXAMPLES

Foams were prepared batch-wise on a laboratory scale in a fixed head foam machine with the formulations listed in Table I. The water, isocyanates, polyols, surfactants, catalysts and other additives were poured from the fixed mixing head into a box positioned inside a chamber in which a vacuum was drawn. The pressure was maintained below atmospheric pressure by pumping air out of the chamber. Using a pressure regulator, the pressure was maintained at the operating pressure while the foam was allowed to rise. In the case of foams made at 1 Bar pressure, the boxes were located outside the chamber as pressure control was not necessary.

Drop curves were developed for each material using the test method of ASTM 1596. Air permeability was determined in cubic feet per square foot per minute for each sample using a Frazier Differential Pressure Air Permeability Pressure Machine in accord with ASTM 737. IFD or "indentation force deflection" was determined in accord with a procedure similar to ASTM D 3574. In this case, foam was compressed by 25% of its original height and the force was reported after one minute. The foam samples were cut to a size 15"×15"×4" prior to testing.

TABLE 1

|  |  | A | B compare | C compare | D | E | F | G compare |
|---|---|---|---|---|---|---|---|---|
| polyol | HS100 | 80 | 80 | 80 | 80 | 80 | 80 | 80 |
| polyol | U1000 | 0 | 0 | 0 | 20 | 0 | 20 | 0 |
| polyol | 3010 | 20 | 20 | 20 | 0 | 0 | 0 | 20 |

TABLE 1-continued

|  |  | A | B compare | C compare | D | E | F | G compare |
|---|---|---|---|---|---|---|---|---|
| polyol | 4001 | 0 | 0 | 0 | 0 | 20 | 0 | 0 |
| surfactant | L618 | 1 | 0 | 0 | 1 | 1 | 1 | 0 |
| surfactant | L620 | 0 | 0.8 | 0.8 | 0 | 0 | 0 | 0.8 |
| amine | ZF53 | 0.3 | 0.25 | 0.25 | 0.3 | 0.3 | 0.3 | 0.25 |
| tin catalyst | K-29 | 0.2 | 0.25 | 0.25 | 0.2 | 0.2 | 0.2 | 0.25 |
| stabilizer | DEA-LFG-85 | 0.3 | 0 | 0 | 0.3 | 0.3 | 0.3 | 0 |
| water |  | 5 | 4.5 | 4.5 | 5 | 5 | 5 | 4.5 |
| isocyanate | Rubinate 7400 | 79.5 | 0 | 0 | 84.6 | 78.4 | 84.6 | 0 |
| isocyanate | TDI 80/20 | 8.8 | 59.0 | 59.0 | 9.4 | 8.7 | 9.4 | 59.0 |
|  | Index | 102 | 113 | 113 | 102 | 102 | 102 | 102 |
|  | Chamber Pressure (mb) | 650 | 650 | 1000 | 650 | 650 | 800 | 1350 |
|  | Density | 1.06 | 1.05 | 1.35 | 1.05 | 1.02 | 1.30 | 1.75 |
|  | $IFD_{25}$ | 74 | 38 | 75 | 81 | 69 | 108 | 105 |
|  | ½" perm. | 58 | 85 | 170 | 33 | 50 | 42 | 242 |

The polyols were obtained from the following suppliers: ARCOL® HS100 and ARCOL® U1000 from Bayer AG; and VORANOL® 3010 and 4001 from Dow Chemical. The surfactants NIAX® L618 and L620 were obtained from CK Witco. The amine catalyst ZF53, the tin catalyst K-29 and the stabilizer DEA-LFG-85 were from Huntsman. The MDI RUBINATE® 7400 isocyanate was from Huntsman and the TDI 80/20 was from Dow Chemical.

Figure 2:
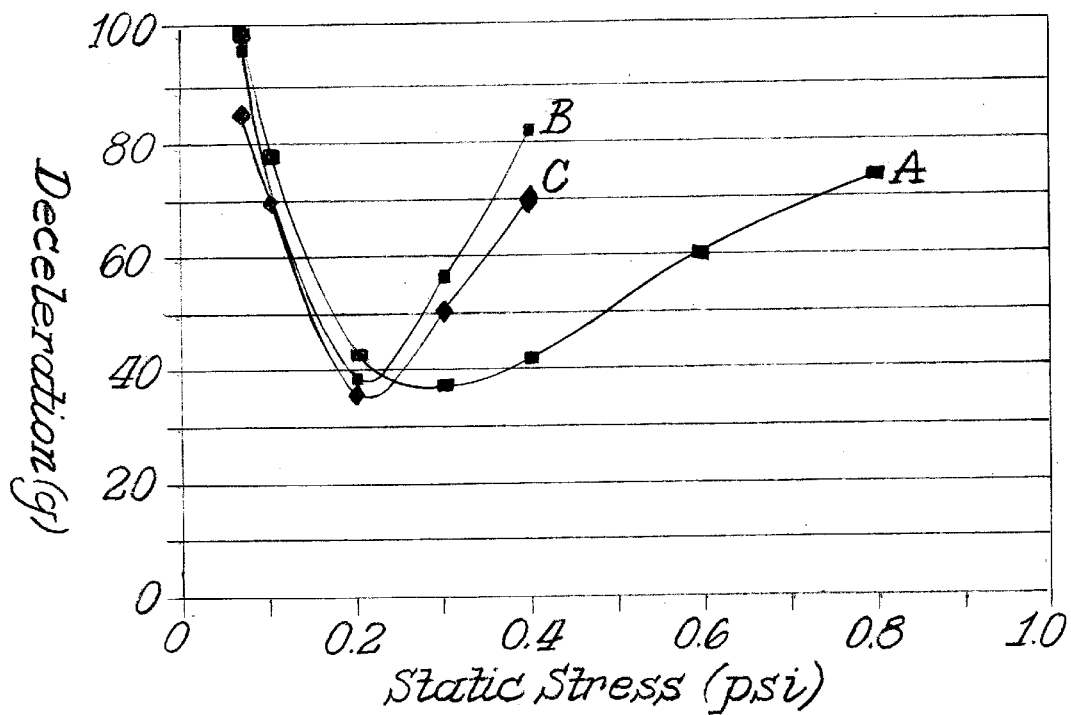
FIG. 2 is a graph of deceleration versus static loading comparing the dynamic cushioning curve for foams of substantially equivalent chemical composition prepared at vacuum (invention) and at atmospheric (prior art) conditions.

As shown in FIG. 2, Example A was produced with a 90/10 MDI/TDI polyisocyanate blend using an operating pressure of 0.65 Bar. The resulting foam had a density of 1.06 pounds per cubic foot and an $IFD_{25}$ of 74 lb. In comparison, Example B was produced with TDI as the sole polyisocyanate. The water level was adjusted in Example B such that the resulting density of the foams of Example B and Example A would be approximately equivalent. As shown in FIG. 2, for foams at nearly the same density, the MDI/TDI foam sample offered a much better cushioning performance.

Example C was prepared using the same formulation as Example B. However, Example C was foamed at atmospheric operating pressure of 1 Bar. The Example C foam is an example of the typical polyurethane foam commonly used in shipping applications. Referring again to FIG. 2, at the lower density, but similar $IFD_{25}$, Example A had a better dynamic cushioning curve and thus a better cushioning performance than the foam of Example C. If a package were designed for shipping an object that could be subjected to no more than 50 G, a static stress of no more than 0.30 would be required for a 2-inch thick cushion of the foam of Example C. In comparison, a greater static stress of 0.48 would be required for the foam of Example A. This is more than a 40% reduction in the foam surface area required, and therefore corresponds to a 40% savings in foam material for the same shipping application.

When the performance of the foams of Example B and C are compared, as shown in FIG. 2, one observes that the reduced pressure foaming condition does not alone produce foams with the cushioning performance advantages. The unexpected performance advantages come from the combination of (1) a formulation with a MDI/TDI polyisocyanate blend that is (2) foamed at reduced operating pressure.

Figure 3:
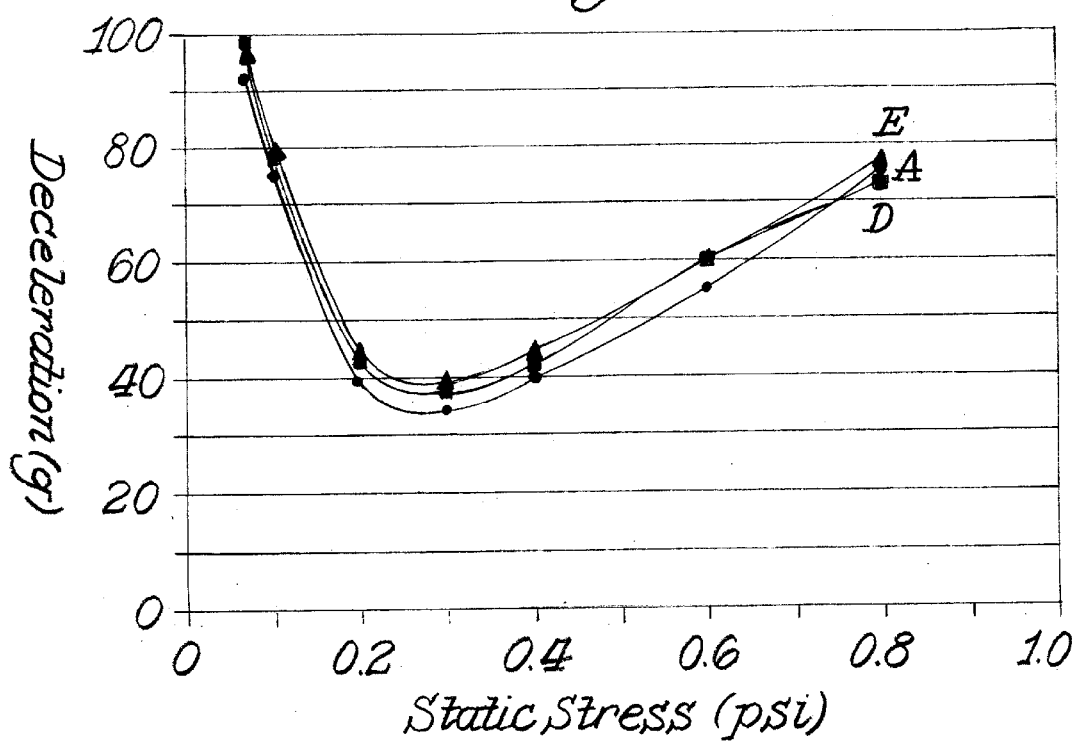
FIG. 3 is a graph of deceleration versus static loading comparing the dynamic cushioning curve for foams of substantially equivalent density and prepared at vacuum (invention) using different polyols.

FIG. 3 compares the performance of the foams from Examples A, D and E. Examples D and E were prepared at 0.65 controlled vacuum conditions using a 90/10 MDI/TDI polyisocyanate blend. The differences in formulations stem from the different polyol combinations used in these Examples: V3010 was used in Example A; U-1000 was used in Example D and V-4001 was used in Example C. While Example D offers the advantage of higher $IFD_{25}$ and a slightly better cushioning curve, Example E offers the advantage of having greater processing latitude. Foams with greater processing latitude are easier to cut and have less tendency to shrink.

Figure 4:
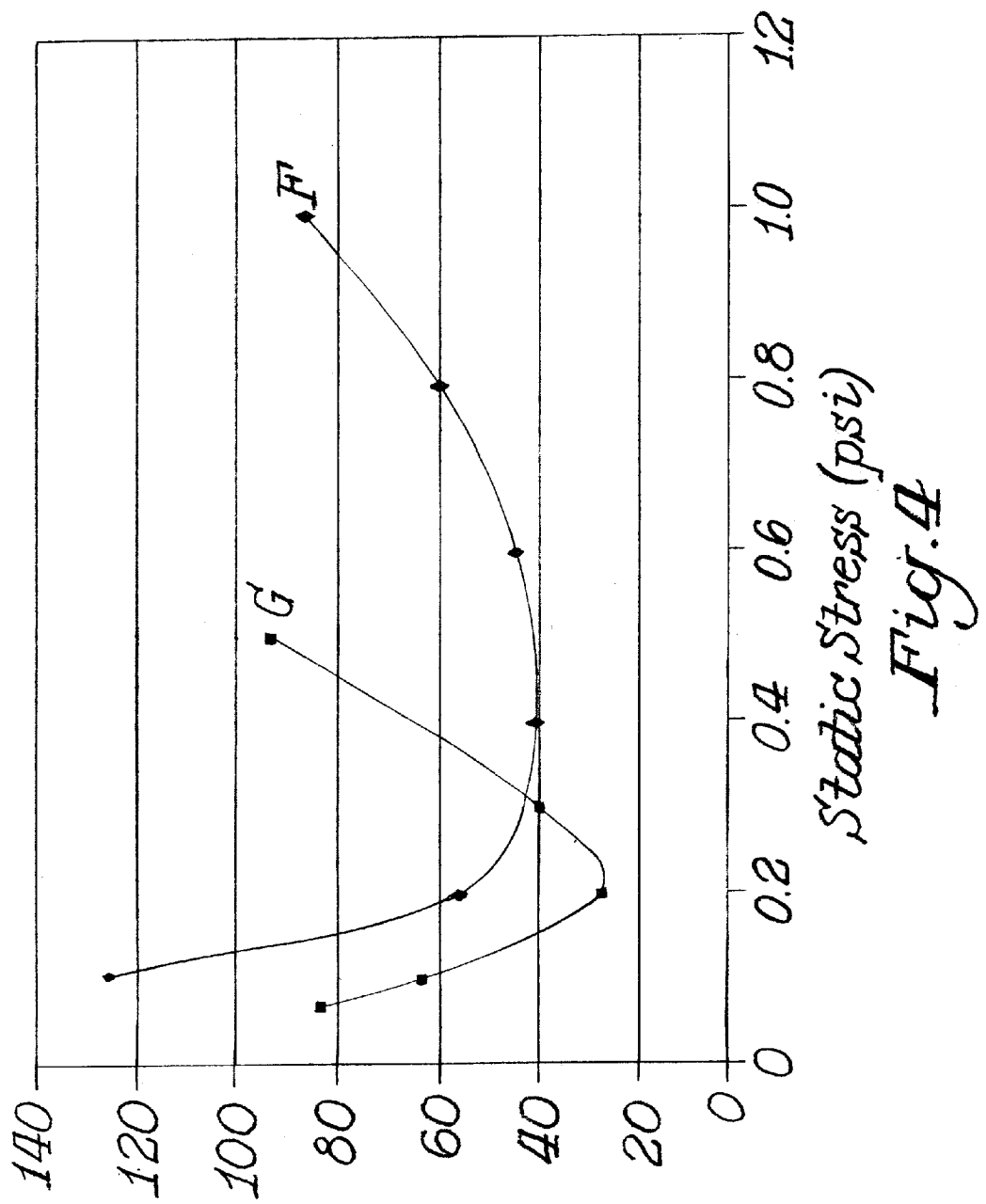
FIG. 4 is a graph of deceleration versus static loading comparing the dynamic cushioning curve for foams of substantially equivalent $IFD_{25}$ prepared at vacuum (invention) and at elevated pressure.

As a further illustration of the performance advantage of the foams according to the invention, in FIG. 4 we compared the performance of a 1.75 pound per cubic foot foam prepared with TDI (Example G) with a 1.3 pound per cubic foot foam prepared with a blend of MDI/TDI (Example F). Again, the combination of MDI/TDI and a reduced operating pressure provided a foam with better dynamic cushioning curve at a reduced density.

The invention has been illustrated by detailed description and examples of the preferred embodiment. Various changes in form and detail will be within the skill of persons skilled in the art. Therefore, the invention must be measured by the claims and not by the description of the examples or the preferred embodiments.

We claim:

1. A method for producing an energy-absorbing polyurethane foam, comprising the steps of:

(1) preparing a foam-forming composition from: (a) from 10 to 50% by weight of total polyol of a polyether polyol having a functionality in the range from about 2.2 to 3.5 and a hydroxyl number in the range from about 28 to 168 and containing up to 30% EO; (b) from 50 to 90% by weight of total polyol of a graft polyol having a functionality in the range from about 2.5 to 3.0 and a hydroxyl number in the range from about 25 to 50 and containing from 50/50 to 80/20 of styrene/acrylonitrile; (c) a polyisocyanate containing at least 5% by weight toluene diisocyanate and at least 80% by weight methylene diisocyanate wherein at least 50% by weight of the methylene diisocyanate is 4, 4' methylene diisocyanate; and (d) a blowing agent, and (2) forming the polyurethane foam from the foam-forming composition under controlled pressure conditions from about 0.5 to about 0.90 bar (absolute).

2. The method of claim 1, wherein the polyurethane foam is formed under controlled pressure of about 0.5 to 0.8 bar (absolute).

3. The method of claim 1, wherein the polyether polyol is present in an amount from 15 to 25 weight percent based on the total polyol in the composition.

4. The method of claim 1, wherein the graft polyol is present in an amount from 75 to 85 weight percent based on the total polyol in the composition.

5. The method of claim 1, wherein the foam-forming composition contains up to 2 parts per 100 parts polyol of an amine catalyst.

6. The method of claim 1, wherein the foam-forming composition contains up to 0.5 parts by weight per 100 parts polyol of an organotin catalyst.

7. The method of claim 1, wherein the foam-forming composition contains up to 2 parts by weight per 100 parts polyol of a surfactant.

8. The method of claim 1, wherein the resulting foam has a density in the range of about 0.7 to 1.3 pounds per cubic foot.

9. The method of claim 1, wherein the isocyanate index is in the range from 95 to 110.

10. The method of claim 1, wherein the foam-forming composition contains from 8 to 11% by weight based on total polyols of toluene diisocyanate.

11. The method of claim 1, wherein the foam-forming composition contains at least about 90% by weight based on total polyols of methylene diisocyanate.

12. The method of claim 11, wherein from 50% to 60% by weight of the methylene diisocyanate is 4, 4' methylene diisocyanate.

13. The method of claim 1, wherein the isocyanate index is within the range from about 100 to 105.

14. The method of claim 1, wherein the graft polyol comprises at least 75% by weight of the total polyol, and has a finctionality in the range of 2.8 to 2.9 and contains styrene to acrylonitrile in a ratio 70/30.

15. A polyurethane foam produced according to the method of claim 1.

* * * * *

UNITED STATES PATENT AND TRADEMARK OFFICE
CERTIFICATE OF CORRECTION

PATENT NO. : 6,420,448 B1
DATED : July 16, 2002
INVENTOR(S) : Michael F. Hnatow et al.

It is certified that error appears in the above-identified patent and that said Letters Patent is hereby corrected as shown below:

Column 10,
Line 14, "finctionality" should read -- functionality --.

Signed and Sealed this

Nineteenth Day of November, 2002

Attest:

Attesting Officer

JAMES E. ROGAN
Director of the United States Patent and Trademark Office